April 11, 1961 O. VON ZELEWSKY 2,978,939
METHODS OF AND APPARATUS FOR MACHINING OF WORKPIECES
BY MEANS OF COPYING MACHINE TOOLS
Filed March 12, 1956 10 Sheets-Sheet 1

Fig.1

INVENTOR.
OTTOMAR von ZELEWSKY
BY

April 11, 1961 O. VON ZELEWSKY 2,978,939
METHODS OF AND APPARATUS FOR MACHINING OF WORKPIECES
BY MEANS OF COPYING MACHINE TOOLS
Filed March 12, 1956 10 Sheets-Sheet 5

Fig. 4

INVENTOR.
OTTOMAR VON ZELEWSKY
BY

April 11, 1961 O. VON ZELEWSKY 2,978,939
METHODS OF AND APPARATUS FOR MACHINING OF WORKPIECES
BY MEANS OF COPYING MACHINE TOOLS
Filed March 12, 1956 10 Sheets-Sheet 8

INVENTOR.
OTTOMAR VON ZELEWSKY
BY
Leon M. Strauss
AGT.

April 11, 1961 O. VON ZELEWSKY 2,978,939
METHODS OF AND APPARATUS FOR MACHINING OF WORKPIECES
BY MEANS OF COPYING MACHINE TOOLS
Filed March 12, 1956 10 Sheets-Sheet 10

OTTOMAR VON ZELEWSKY
INVENTOR.

BY

United States Patent Office 2,978,939
Patented Apr. 11, 1961

2,978,939

METHODS OF AND APPARATUS FOR MACHINING OF WORKPIECES BY MEANS OF COPYING MACHINE TOOLS

Ottomar von Zelewsky, Neuhausen am Rheinfall, Switzerland, assignor to Georg Fischer Aktiengesellschaft, Schaffhausen, Switzerland, a Swiss company Filed Mar. 12, 1956, Ser. No. 570,989

Claims priority, application Switzerland Mar. 12, 1955

10 Claims. (Cl. 82—14)

The present invention relates to methods of and apparatus for machining of workpieces by means of copying machine tools, and especially by means of copying lathes.

One of the principal objects of the present invention is to provide means facilitating machining of a workpiece in accordance with the contours of at least one copying template arranged on the bed of the machine tool being employed.

Another object of the present invention is to provide means affording apparatus for implementing the aforesaid machining procedures, such apparatus generally including two slides or carriages arranged one on top of the other and a feeler member, the latter being supported by the upper, tool-carrying slide which is arranged for displacement along two mutually perpendicular coordinates disposed in a common plane, said feeler member being itself movable in two coordinates for controlling the displacements of the two slides.

In particular, a number of copying procedures are known which make use of feed mechanisms for displacing one of the slides at a constant displacement speed, which mechanisms work independently of the feeler member. As a result, the cutting forces must be mechanically effected by the feed gearing or drive. This requires extremely strong driving elements of relatively large dimensions.

Moreover, in order to machine a workpiece with contours arranged perpendicularly or at an inclination to its axis of rotation, known copying lathes generally have the feeler-carrying upper slide pivotally or swingably and adjustably arranged relative to said axis of rotation.

It is, therefore, another principal object of the present invention to provide means avoiding the disadvantages and drawbacks of heretofore known apparatus and procedures through arrangement of the feeler member for adjustment, as desired, along two coordinates located in a plane parallel to the aforesaid plane of slide displacement by means of two displacement mechanisms preferably disposed perpendicular to one another, whereby selectively and alternately one of the displacement mechanisms effects a feed motion for the feeler member while the other displacement mechanism exerts a constant force on the feeler member.

Accordingly, a further object of the present invention is to provide means enabling the displacement direction of that mechanism which effects the constant feed motion of the feeler member through the intermediary of suitable feed elements to be adapted to the shape or form of the workpiece.

More specifically, there is provided, according to the invention, apparatus for carrying out the improved machining methods or procedures, which apparatus is characterized by the fact that on the machine bed or frame there are arranged two, preferably perpendicular, displacement mechanisms operatively connected with the feeler member by means of suitable transmission elements or members. Further, there are provided a feed gearing system for imparting a constant movement to the feeler member, as well as pressing members which force the feeler member against the template and which are alternately connectable with each of the two displacement mechanisms.

It is also an object of the present invention to provide means conducive to highly simplified, simultaneous or consecutive machining of both inner and outer surfaces of hollow workpieces or of different portions of one and the same workpiece surface through the use of at least two templates disposed on the machine frame and arranged for controlling the actions of at least two cutting or turning tools.

These and other objects of the invention will become further apparent from the following detailed description, reference being made to the accompanying drawings showing preferred embodiments of the invention.

While there is shown and described herein certain specific structure embodying the invention, it will be manifest to those skilled in the art that various modifications and rearrangements of the parts may be made without departing from the scope of the invention, and that the same is not limited to the particular form herein shown and described, except in so far as indicated by the appended claims.

Referring now more particularly to Figs. 1, 1a, 8 and 9, the slides or carriages and the control elements of the control system there shown are illustrated in a position in which a partly indicated workpiece 1 supported by a headstock 121 and a tailstock 124 may be machined to present a plurality of stepped portions varying in size when viewed in a direction perpendicular to the axis of rotation 69 of the workpiece. The ultimate contours of the workpiece 1 are illustrated by the broken lines.

A base carriage or saddle 3 is mounted on slideway means 2 disposed parallel to the axis of rotation 69 of the workpiece, the saddle being displaceable by means of an arrangement to be more fully described hereinafter. On the saddle 3 there is arranged a power cylinder 5 in which is disposed a piston 4, a piston rod 6 extending from said piston and being fixed at its free end to the bed or to a standard 7 (not fully shown in Figs. 1, 1a, 8 and 9) of the machine.

A tool slide or carriage 9 is arranged on the saddle or carriage 3 and preferably at right angles to the slideway means 2, the tool slide carrying a cutting or turning tool 10 and being displaceable relative to the carriage or saddle 3 along slideways 8. Mounted on the tool slide 9 is a power cylinder 11 in which is disposed a piston 12, a piston rod 13 extending from the latter and being fixed at its free end to the base carriage or saddle 3 by means of a bracket 151 (as shown in Fig. 1a).

Disposed on the tool slide 9 is a bearing housing 14 in which a copying feeler lever 15 is universally supported intermediate its ends by means of a ball-shaped socket 16 for pivotal movement of a few degrees. Two control cylinders 17 and 18 are arranged at right angles to one another on the bearing housing 14, the axes of these control cylinders extending parallel to the axes of the power cylinders 5 and 11, respectively.

A control slide valve 19 is reciprocally arranged in the control cylinder 17 and connected by means of a resilient rod or like member 21 to the feeler lever 15, while a control slide valve 20 is reciprocally disposed in the control cylinder 18 and likewise connected to the feeler lever 15 by means of an elastic or resilient member or rod 22. In lieu of the illustrated hydraulic arrangements 4, 5, 6 and 11, 12, 13, a screw actuated copying arrangement could be employed in which two hydraulic pumps act on a spindle and thereby impart to the saddle and to the tool slide positive movements by means of self-locking threaded spindles.

The hydraulic control system is driven by means of a pump 23 which draws a suitable pressure medium, such as oil, from a reservoir 24 and feeds the same through a regulating valve 25 and a conduit 26 to the control cylinders 17 and 18. Conduits 27 and 28 lead from the control cylinder 17 to the power cylinder 5, and conduits 29 and 30 lead from the control cylinder 18 to the power cylinder 11. Pressure fluid leaving the power cylinders 5 and 11 and returning to the control cylinders 17 and 18 is then returned through the conduits 150 to the reservoir 24.

A template holder 35 carrying a template 34 is supported from the machine standard or bed 7 by means of supports 33 only schematically illustrated. If desired, two template holders each carrying a separate template could be arranged opposite one another, as more fully described hereinafter.

A feed gearing or transmission system 59 of any suitable type is arranged on the standard or frame 7, the rotational speed of the input gear shaft 152 of said system depending on the rotational speed of the working spindle in the headstock 121, and the regulatable and selectively reversible rotational speed of the output gears being taken off by means of two flexible shafts 60 and 61.

Figure 1:
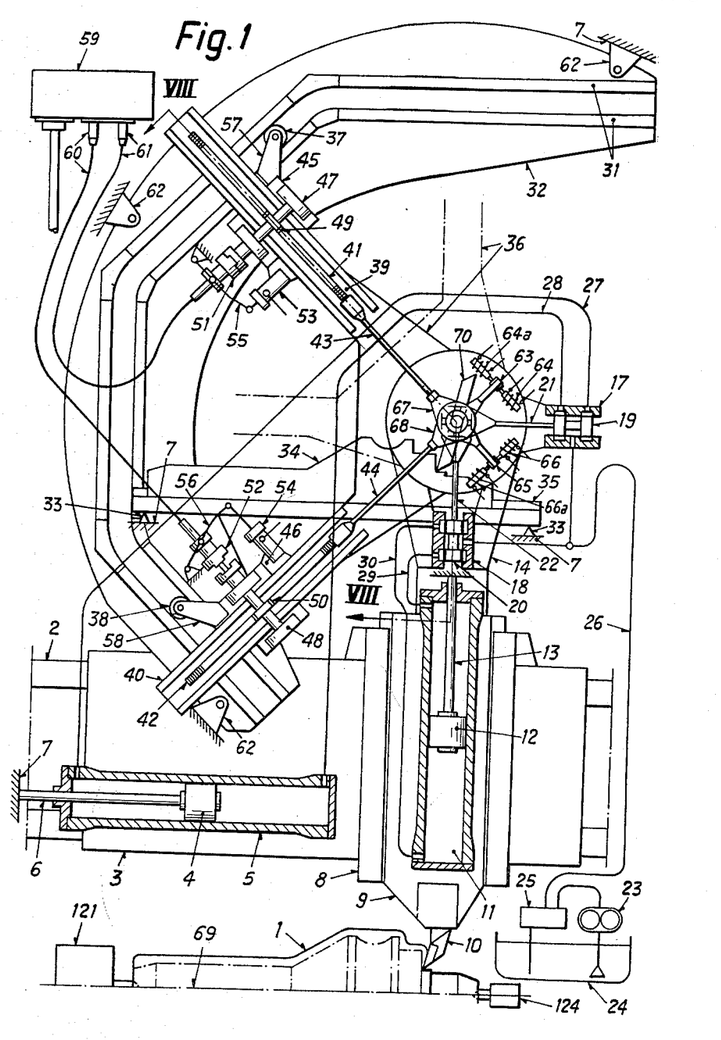
Fig. 1 is a partly schematic, partly sectional plan view of a first embodiment of a machining control system according to the present invention.
Figure 1A:
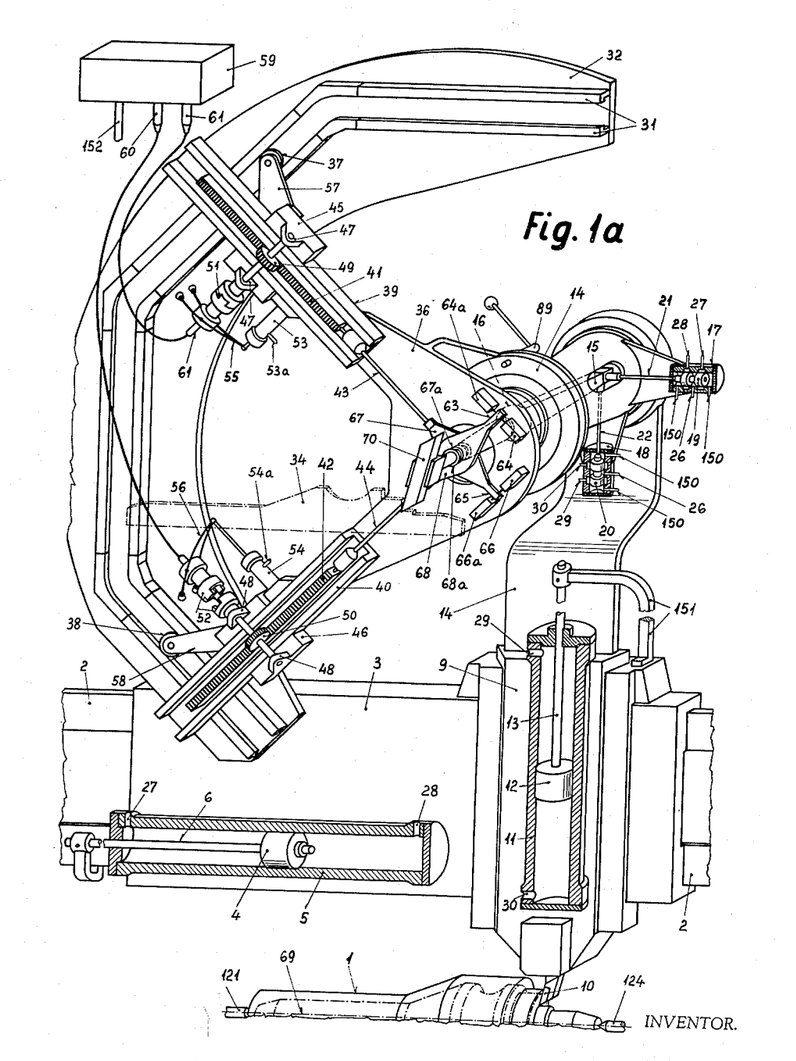
Fig. 1a is a part schematic and part perspective view of the mechanism of the embodiment shown in Fig. 1.

Supported on the standard or frame element 7 of the machine tool by means of supporting lugs 62 is a carrier 32 having a polygonal guideway 31 arranged thereon (see Fig. 1).

Figures 8, 9:
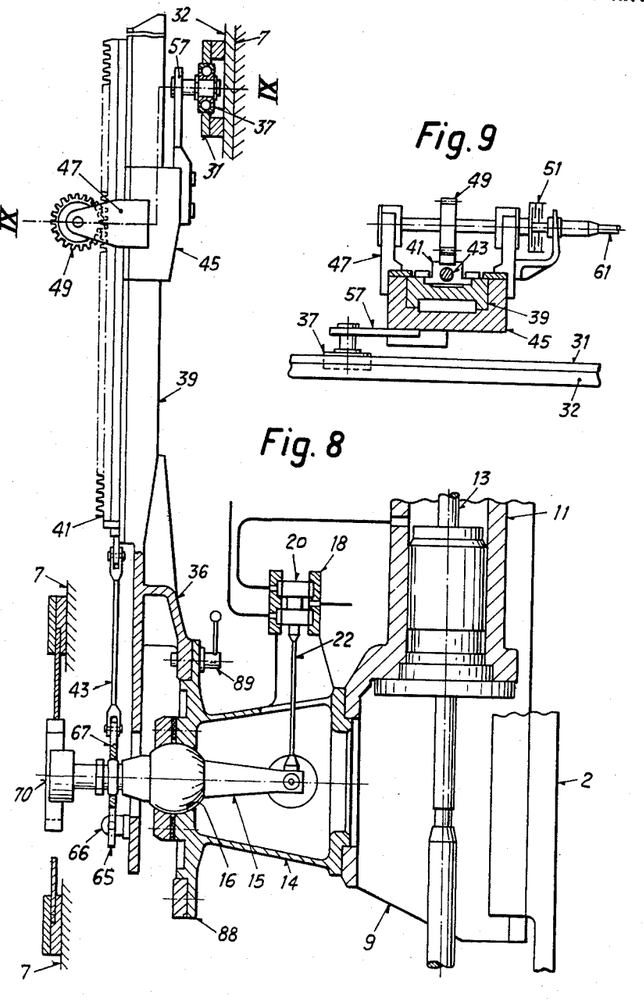
Fig. 8 is a sectional view taken along the line VIII—VIII in Fig. 1.
Fig. 9 is a sectional view taken along the line IX—IX in Fig. 8.

As may be seen more particularly from Fig. 8, an annular guide structure 88 is provided on the bearing housing 14 of the tool slide 9, on which guide structure a carrier frame 36 is rotatably supported, clamping devices 89 being provided to fixedly connect the carrier frame 36 to the guide structure. Arranged on the carrier frame (see Fig. 1a) are two rack supports 39 and 40 disposed preferably at right angles to one another, racks 41 and 42, respectively, being slidably displaceable on the rack supports 39 and 40.

A connecting rod 43 extends from the rack 41 to a guide piece 67 provided with a ball-like socket which embraces a correspondingly formed part of the feeler lever 15. In a similar manner, the rack 42 is provided with a connecting rod 44 at one end of which is provided a guide piece 68 having a ball-like socket embracing a second correspondingly formed part of the feeler lever 15.

Two bearing slides 45 and 46 are located on the rack supports 39 and 40, respectively, for longitudinal displacement relative thereto, said bearing slides being provided with bearings 47 and 48 in which are borne pinions 49 and 50 meshing, respectively, with the racks 41 and 42. The pinions 49 and 50 may be selectively connected by means of clutches or couplings 51 and 52 with the flexible shafts 61 and 60, respectively. By way of example, coupling or decoupling of the pinions and shafts may be effected by means of hydraulically actuated pistons disposed in operating cylinders 53 and 54 and connected to suitable linkages 55 and 56. The connection between the control cylinders 53 and 54 and the pump or like source of hydraulic power 23 as well as the control elements, such as valves and the like, associated with such connections are not shown in the drawings.

Lugs 57 and 58 extend, respectively, from the bearing slides 45 and 46 and carry at their free ends rollers 37 and 38 which are received and guided in the polygonal guideway 31 on the carrier 32.

During machining of the workpiece 1, the flexible shaft 61, for example, is coupled with the pinion 49 in order to effect a feed motion of the tool slide 9 toward rack 41. This occurs as a result of the fact that the rack 41 acting through the control rod 43 and guide piece 67 exerts on the feeler member or head 70 a constant pull which, as seen in Fig. 1, is directed toward the upper left-hand corner of said figure.

For the purpose of imparting to the feeler head 70 a movement in a second coordinate disposed to bring this head into contact with the temples 34 for following the latter during copying work, regardless of the orientation of the template, and for the purpose of controlling the rapid traverses of the carriages or slides 3 and 9 in the desired directions, there are provided on the guide pieces 67 and 68 arms 63 and 65 which are arranged to be acted upon by electromagnets 64—64a and 66—66a, respectively.

In the example illustrated in Fig. 1, the magnet 66a is energized in order to pull the feeler head 70 toward the lower left-hand corner of the figure, to thereby maintain the feeler head in continued contact or engagement with the contoured surface of the template 34 during the entire machining operation. The connection of these electromagnets with the remaining elements of the complete control system is not illustrated in the drawings.

If, in contradistinction to the example shown in Fig. 1, it is desired to machine workpieces with shoulders disposed at an angle of 60° to the axis of rotation 69 of the workpiece-supporting spindles, the clamping devices 89 are loosened to enable the carrier frame 36 and the rack supports 39 and 40 to be shifted on the guide structure 88 through an angle of 45° in a clockwise direction, the guide rollers 37 and 38, of course, remaining in engagement with the polygonal guideway 31.

The carrier frame 36 thus will assume the position illustrated in broken lines in Fig. 1, as a result of which the guide roller 37 is located in the horizontally extending portion of the guideway 31 while the roller 38 is disposed in the vertically extending portion of said guideway.

The operation of the control system according to Figs. 1, 1a, 8 and 9 is as follows:

It must first be determined, with respect to the machining operation to be performed, in which direction relative to the template the constant feed motion of the feeler head is to be effected and in which direction the copying movement of the feeler head is to be effected. Most advantageously, in the example of Fig. 1 the constant feed motion is effected in a direction leading from the lower right-hand corner to the upper left-hand corner of the drawing.

After the workpiece 1 is clamped in position, the carrier frame 36 is moved to the solid line position and immobilized thereat by mean of the clamping devices 89. The template 34 is now mounted at a suitable location and the tool 10 is properly fixed to the tool slide 9.

As already described hereinabove, a feed movement is imparted to the feeler head 70 and consequently to the tool slide 9, i.e. the saddle 3 by the feed gearing 59 acting through the intermediary of the flexible shaft 61 and the remaining operating or control elements 49, 41, 43, 67, 15, 21, 19, 22, 20, 11 and 5 in the direction of rack 41. Upon energization of the magnet 66a, the feeler head 70 is drawn downwardly and to the left (as seen in Fig. 1) against the template 34, i.e., perpendicularly to the direction of feed movement of the feeler means 15 and 70.

More specifically, when the gearing or transmission 59 is actuated only, the feeler lever 15 is subjected to a pull directed upwardly and to the left as seen in Fig. 1. The control slide valves 19 and 20 are, therefore, displaced to the right by means of the rod 21 (since the pivot location 16 of the lever 15 is between the lever ends to which the rods 43 and 21 are connected and downward by the rod 22, respectively). Pressure medium flows from the conduits 26 through the conduits 27 and 29 and to the left-hand side or face of the piston 4 in the power cylinder 5, and to the upper side of piston 12 in cylinder 11, respectively. Pressure medium displaced from the right-hand side of the piston 4 passes via conduit 28 into control cylinder 17 from where it escapes at the left-hand side of the control slide valve 19 through conduit 150 into the reservoir 24. On the other hand pressure medium from the lower side of piston 12 escapes by way of conduit 30, over control cylinder 18 at the upper side of valve 20 into return conduit 150. This effects movement of the carriage or saddle 3 to the left on the guides or supports 2 and upward movement of the tool slide 9 on saddle 3, so that the tool 10 will be imparted a movement in a direction parallel to rack 41.

In actual operation, however, the feeler head is simultaneously acted upon downwardly and to the left by the force of attraction of the magnet 66a, respective components of this force in the directions of valve 19 and valve 20 being superimposed upon corresponding coaxial force components set up by rack 41. It will thus be understood that while valve 19 will be imparted a further deflection or displacement from magnet 66a added to that from rack 41, the deflection of valve 20 under the effect of rack 41 will be overcome by the oppositely directed force component from magnet 66a.

As the feeler head 70 moves from the right to the left along the template 34 and arrives, for example, at the position shown in Fig. 1, it will be displaced upwardly to effect, through the intermediary of the feeler lever 15, a concurrent downward movement of the control slide valve 20 in the control cylinder 18. As a result, pressure medium flows from the conduit 26 through the conduit 29 and to the upper side or face of the piston 12 in the power cylinder 11, whereby the tool slide 9 is displaced upwardly. Pressure medium displaced from the lower side of the piston 12 passes via conduit 30 into the control cylinder 18 from where it escapes at the upper side of the control slide valve 20 through 150 into the reservoir 24.

Thus it will be seen that through the joint influence of the constant feed mechanism and of the magnet 66a on the feeler lever 15, there are effected, during movement of the feeler head 70 along the template, simultaneous displacements of the saddle 3 and the tool slide 9, as a result of which the contours of the workpiece may be shaped in conformity with the contours of the template.

As soon as the tool arrives at the left-hand end of the workpiece 1, the magnet 66a is deenergized by suitable switch elements (schematically shown) while at the same time the magnet 66 is energized. Concurrently, the shaft coupling 51 may be released through suitable elements (not shown) while the magnet 64 is energized.

Through the deenergization of the magnet 66a and energization of the magnet 66, the feeler lever 15 is swung or pivoted in such a manner that the control slide valve 19 in the control cylinder 17 is moved to the left, whereby pressure medium flows from the pump 23 through the conduits 26 and 28 to the right-hand side of the piston 4. This effects a rapid displacement or return traverse of the saddle 3 along the slideway means 2 to its starting position at the right-hand end of said slideway means. Since the control slide valve 20 in the control cylinder 18 is moved downwardly at the same time, pressure medium flows through the conduits 26 and 29 to the upper side of the piston 12 to retract the tool slide 9 and the tool 10 from the workpiece 1.

Through the provision of suitable switch or control elements it is possible to carry out the above described energization and deenergization of the magnets 64, 64a, 66 and 66a in direct dependence on the extent of displacement of the slides or carriages 3 and 9.

During the machining operation both the carrier 32 with the guideway 31 and the template holder 35 with the copying template 34 remain immovably connected to the bed or standard 7 of the machine tool. The carrier frame 36 with the two rack supports 39 and 40, however, moves together with the tool slide 9 due to the follow-up movement of the latter with respect to the displacement of the feeler head 70, and thus follows the movements of the tool 10.

The racks 41 and 42 are, therefore, displaced along the rack supports 39 and 40 while the guide rollers 37 and 38 are displaced along the guideway 31. The rack supports 39 and 40 are perpendicuar, for each position of the copying feeler head 70, to the respective parts of the guideway in which the rollers engage.

Figure 2:
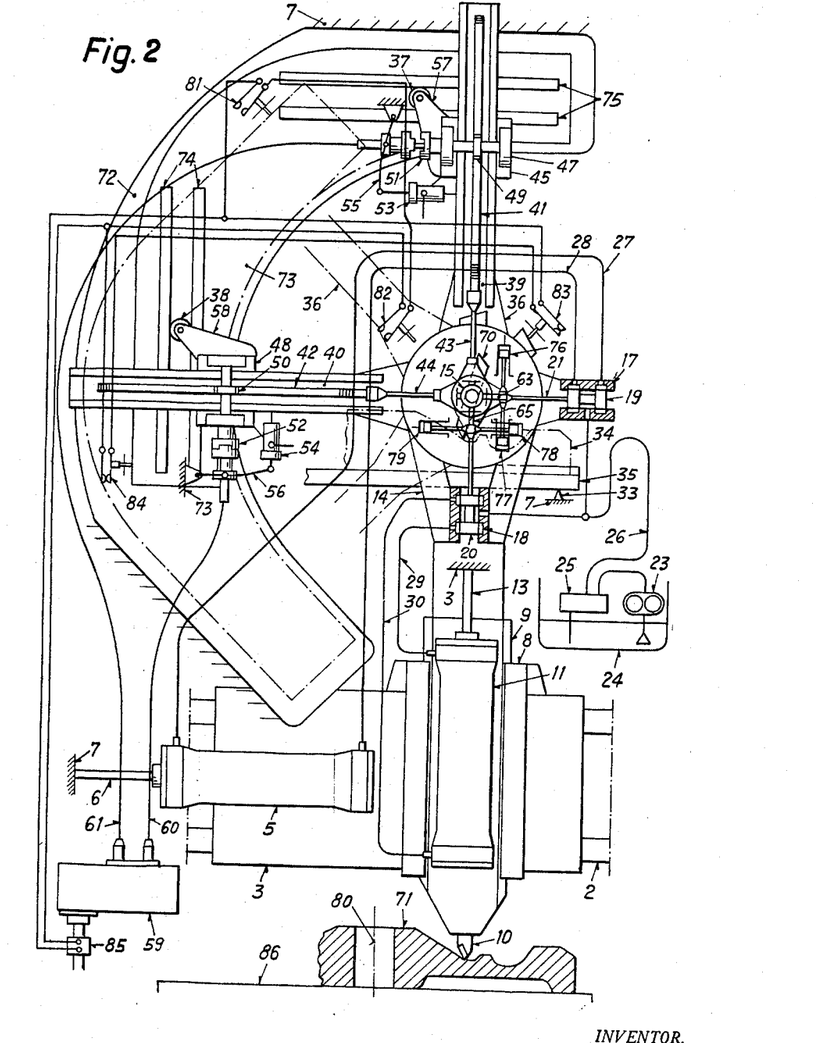
Fig. 2 is a similar plan view of a second embodiment of the control system.

A further embodiment of the present invention is shown in Fig. 2, in which those elements identical with the elements shown in Fig. 1 are designated by the same reference numerals. Hereinafter described will be in particular that structure which differs from the structure illustrated in Fig. 1.

The workpiece 71 illustrated in Fig. 2 is, in contradistinction to the workpiece 1 which is mounted between the spindles of a headstock and a tailstock, supported on a working table 86 of a facing lathe (not shown), the indicated axis of rotation 80 of the workpiece being vertically oriented although it could equally well be horizontal.

In lieu of the carrier 32 there is provided a base plate 72 fixed to the bed or frame 7. The plate 72 supports an additional carrier 73 displaceable and swingable thereon from the solid line position to the broken line position, means being provided for fixedly clamping the additional carrier in position. This additional carrier is provided with guideways 75 and 74 for the guide rollers 37 and 38, respectively.

The carrier 73 is made to assume its broken line position when sections of the contours to be imparted to the workpiece 71 extend parallel to the axis of rotation 80. For the machining of contours of the type shown in Fig. 2, however, there must be inserted into the feeler lever 15 a feeler head 70 the form or construction of which corresponds to the form of the tool 10.

To bring about exertion of the necessary pressure of the feeler head 70 against the template 34 and to control the rapid traverses of the carriages 3 and 9, the embodiment of Fig. 2 does not make use of electromagnets but rather of hydraulically or pneumatically actuated pistons 76—77 and 78—79 which act on the arms 63 and 65, respectively.

In addition there are provided electrical safety devices, as more particularly described hereinafter, in order to avoid an accidental and erroneous coupling of the clutches 51 and 52 when the rack supports 39 and 40 are not located on the carrier 73 in predetermined corresponding positions.

For the machining of a workpiece with slanted shoulders, as shown in Fig. 2, the switches 83 and 84 must be closed by the rack support 39 and the carrier 73, respectively, so that the feed gearing or transmission mechanism 59 may be actuated through the electrical switch or control device 85.

When vertical shoulders are to be machined on the workpiece 71, i.e. when the carrier 73 and the carrier frame 36 assume their broken line positions, the switches 81 and 82 must be closed to permit actuation of the gearing or transmission 59 through the switch or control device 85.

The operation of the embodiment of the invention according to Fig. 2 is as follows:

To machine the workpiece 71 in accordance with the contours of the template 34, the parts 36 and 73 must be located in their respective solid line positions. The constant feed movement of the copying feeler lever 15, which takes place horizontally from right to left as seen in Fig. 2, is effected by means of the feed gearing 59 through the intermediary of the elements 60, 52, 50 and 42, as described in the operation of the embodiment according to Fig. 1.

The control slide valve 19 is concurrently displaced to the right so that pressure medium flows from the conduit 26 through the conduit 27 to the left-hand side or face of the piston 4 in the power cylinder 5, whereby the saddle 3 is displaced from right to left along the slideway means 2.

Through suitable control devices (not shown), pressure is applied to the piston 76, thus pivoting the feeler head 70 downwardly. Due to the concurrent downward displacement of the control slide valve 20 pressure medium flows from the conduit 26 through the conduit 30 to the lower side or face of the piston 12 in the cylinder 11, thus displacing the tool slide 9 upwardly.

As in the embodiment of Fig. 1, whenever the feeler head 70 is in contact with the template 34, the hydraulic control system is in a state of equilibrium. During the constant feed traverse of the saddle 3 in a horizontal direction, the feeler head 70 moves along the profile or contours of the template 34, whereby the workpiece 71 has imparted thereto through the intermediary of the tool 10 a profile or contours corresponding exactly to the profile or contours of the template 34.

When the base carriage or saddle 3 arrives at the left-hand end of its path of movement, the pressure is removed from the piston 76, through the action of suitable control means (not shown), while pressure is applied to the piston 77. This effects retraction of the feeler head or member 70 from the template 34 and, through appropriate operation of the control slide valve 20, retraction of the tool 10 from the workpiece 71. The extent of retraction may be limited through further additional control means (not shown).

Concurrently with this retraction, pressure medium is fed into the operating cylinder 54 to disengage the clutch 52. This terminates the forward or feed traverse of the saddle or carriage 3.

Upon application of pressure to the piston 79, which may be effected through suitable automatic means (not shown), the feeler head 70 is moved to the right and the control slide valve 19 to the left, whereby pressure medium flows from the conduit 26 through the conduit 28 to the right-hand side or face of the piston 4 in the power cylinder 5. The carriage 3 is now rapidly returned to its initial or starting position, and the return traverse may be terminated by suitable means (not shown) arranged to control the action of the control slide valve 19.

A further embodiment of the invention is illustrated in Fig. 3, where again such elements as are like those employed in Figs. 1 and 2 are designated by the same reference numerals. Moreover, the arrangement of the saddle 3 and the tool slide 9 is identical with the arrangement thereof set forth in connection with Figs. 1 and 2.

Figure 3:
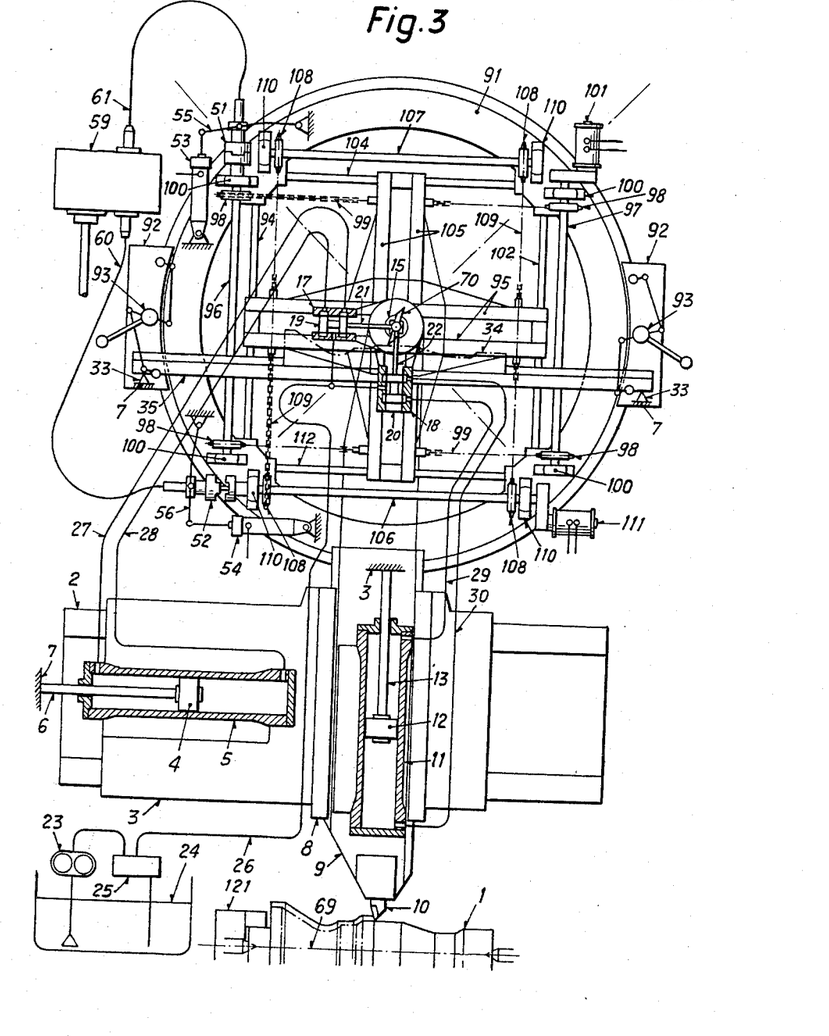
Fig. 3 is a similar plan view of a third embodiment of the control system.

The entire control system for the forward or feed traverse and for the feeler pressure against the template is mounted on a carrier ring 91 which is rotatably carried by means of at least two supports 92 located on the bed or standard 7 of the machine tool, clamping means 93 being provided for locking the carrier ring 91 in position.

Two pairs of parallel guide rods 94, 102 and 104, 112, respectively, are arranged, preferably at right angles to one another, on the carrier ring 91. The guide rods 94 and 102 slidably support the opposite, rigidly interconnected ends of a pair of parallel bars or like members 95, while the guide rods 104 and 112 slidably support the opposite, rigidly interconnected ends of a similar pair of parallel bars 105.

Two pairs of parallel transmission shafts 96, 97 and 106, 107 are supported by means of bearings 100 and 110, respectively, and arranged parallel to the guide rod pairs 94, 102 and 104, 112, respectively. Each of the shafts 96 and 97 is provided with two axially spaced sprocket wheels 98, while each of the shafts 106 and 107 is provided with two axially spaced sprocket wheels 108.

Two sprocket chains 99 pass around and mesh with the wheels 98, the opposite ends of the chains 99 being connected to the parallel bar pair 105. Two further sprocket chains 109 pass around and mesh with the wheels 108, the opposite ends of the chains 109 being connected to the parallel bar pair 95.

Operation of the transmission shafts 96 and 106 may be selectively effected by means of two completely independent driving systems.

By way of example, when a constant feed movement or traverse is to be imparted to one of the parallel bar pairs, the feed gearing 59, which is driven from the headstock 121, is connected either through the flexible shaft 61 and the clutch 51 to the transmission shaft 96 or through the flexible shaft 60 and the clutch 52 to the transmission shaft 106.

The slight pressure which is to be exerted by the feeler head 70 on the template 34 is effected, rather than by the electric or hydraulic means of the embodiments of Figs. 1 and 2, through the action of electric motors 101 and 111 on the feeler lever 15. These motors are arranged to drive the transmission shafts 97 and 106, respectively, whereby the displacements of the parallel bar pairs 105 and 95 occur through the intermediary of the chains 99 and 109, respectively, in the same manner as if the shafts 96 and 106 were being driven through the flexible shafts 61 or 60. By suitably constructing these motors, especially with respect to their output torques, the small pressure of the feeler head 70 against the template 34 may be predetermined.

Figure 4:
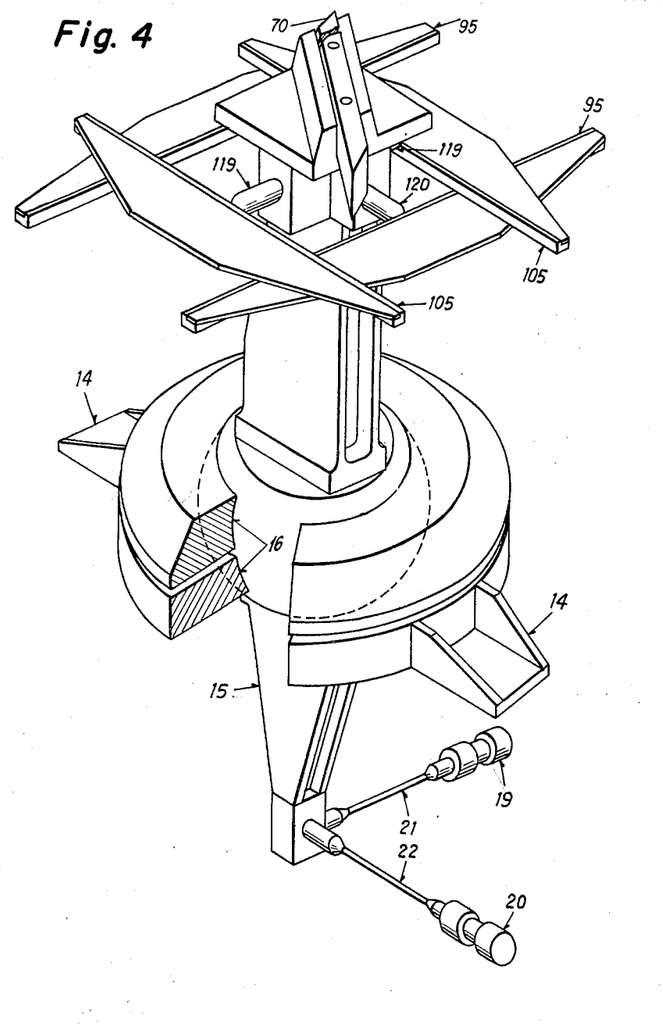
Fig. 4 is a perspective view illustrating one type of support for the feeler member.

The feeler lever 15 is, as before, universally supported in a socket 16 of the bearing housing 14 on the tool slide 9 (see Fig. 4 and also Fig. 8). Likewise, the control cylinders 17 and 18 and their control slide valves 19 and 20 are also arranged on the bearing housing 14, the slide valves being connected to the lever 15 by means of the elastic or flexible elements 21 and 22.

The connections between the feeler lever 15 and the two parallel bar pairs 105 and 95 are formed, as seen in Fig. 4, by means of two pairs of pins or projections 119 and 120 provided with ball-like or spherical ends which enable motion transmission actions between the lever and the parallel bar pairs or frames to be carried out without entailing the possibility of binding or jamming.

The operation of the embodiment of the invention according to Fig. 3 is as follows:

When a workpiece 1 is to be machined in accordance with the profile of a template 34, the elements of the control system assume the indicated positions. The constant feed movement of the carriage or saddle 3 on the slideways or slideway means 2 takes place horizontally and parallel to the axis of rotation 69 of the workpiece.

To this end, pressure medium is introduced into the operating cylinder 53, whereby the clutch 51 is engaged through the action of the linkage 55. The shaft 96 is, consequently, rotated, in accordance with the output of the transmission gearing 59, through the intermediary of the flexible shaft 61.

This rotation is transformed into a right-to-left linear motion of the frame-like structure constituted by the parallel bar pair 105 by means of the sprocket wheels 98 and chains 99, angular displacement of the feeler lever 15 relative to said parallel bar frame 105 being facilitated due to the presence of the round-ended pins 119 (Fig. 4). The control slide valve 19 actuated by the lever 15 effects flow of pressure medium from the conduit 26 through the conduit 27 into the left-hand end of the power cylinder 5, whereby the displacement of the saddle 3 from right to left is effected.

The motor 111 is switched on or energized by suitable means (not shown) and drives the transmission shaft 106 for the purpose of engendering displacement of the tool slide 9 relative to the saddle 3 and in a direction transverse to the axis of rotation 69 of the workpiece, the transmission shaft 106 at this time being decoupled from the flexible shaft 60. Thus, the motor 111 exerts a slight downward pull on the other frame-like structure constituted by the parallel bar pair 95 through the chains 109.

The resulting movement of the parallel bar frame 95 is transmitted to the lever 15 through the pins 120 so as to pull the control slide valve 20 upwardly and to enable pressure medium to flow from the conduit 26 through the conduit 30 into the lower end of the power cylinder 11, whereby the tool slide 9 is moved toward the workpiece 1. As soon as the feeler head 70 engages the template 34, the hydraulic system arrives at a state of equilibrium and the forward motion of the tool slide 9 ceases.

As the feeler head or member moves along the template 34 during the horizontal displacement of the saddle 3, the lever 15 executes small shifting or pivotal movements corresponding to the profile of the template due to the constant pull exerted on said lever by the motor 111. These pivotal movements or shifts of position are transmitted to the control slide valve 20, whereby the flow of pressure medium to the cylinder 11 is so varied as to impart to the tool slide 9 movements corresponding to the movements of the feeler head and feeler lever.

As soon as the saddle 4 arrives at its terminal position at the left-hand end of the slideways 2, the clutch 51 is disengaged by means of the piston in the operating cylinder 53, whereby the movement of the saddle is interrupted.

The direction of rotation of the motor can now be reversed to pivot the lever 15 in such a manner as to retract the feeler head from the template, whereby the tool 10 is retracted from the workpiece through the action of the control slide valve 20 in feeding pressure medium to the upper end of the cylinder 11. Suitable means for limiting the retraction of the tool may also be provided.

Figure 5:
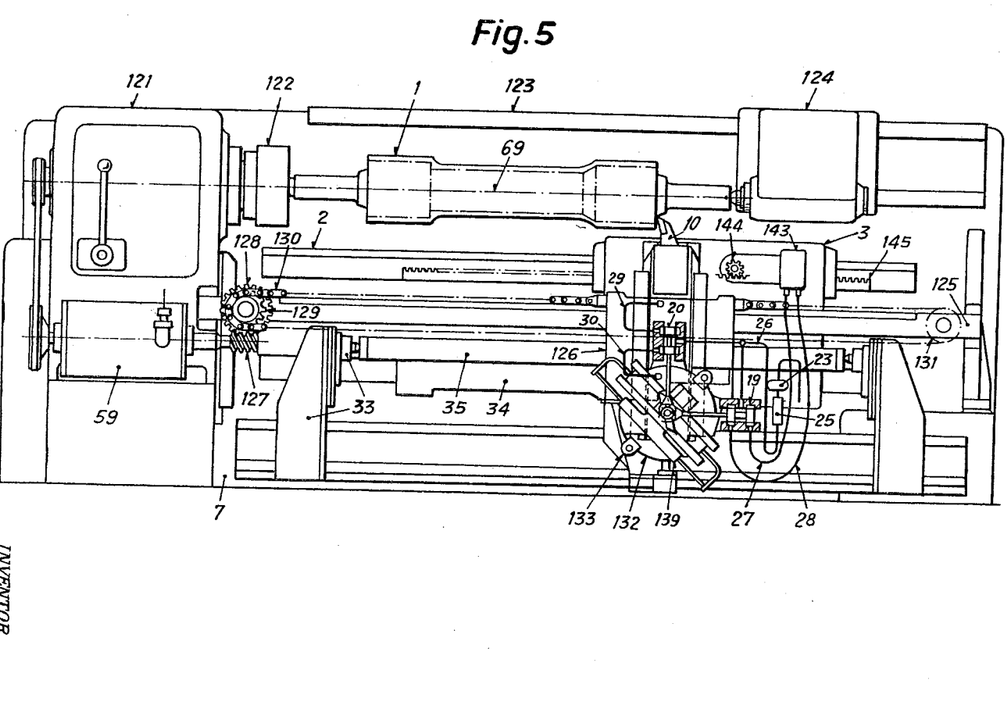
Fig. 5 is a top plan view of a copying lathe embodying the principles of the present invention in somewhat modified form.
Figure 6:
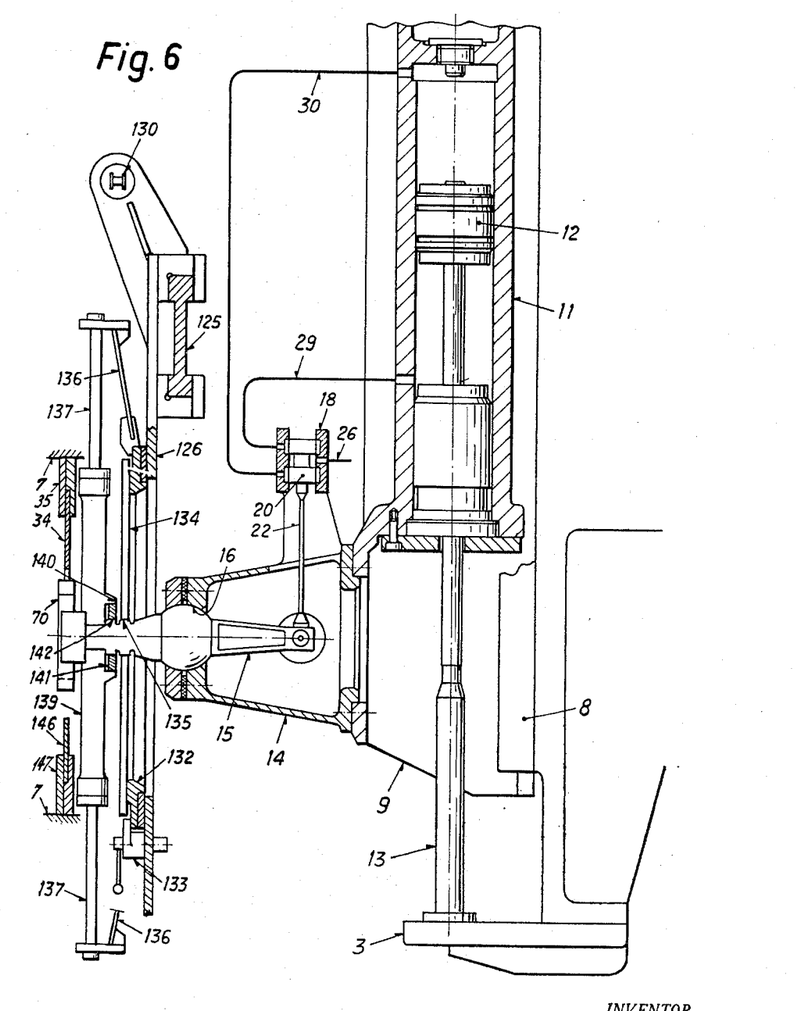
Fig. 6 is a partly sectional view taken along the line VI—VI in Fig. 7.
Figure 7:
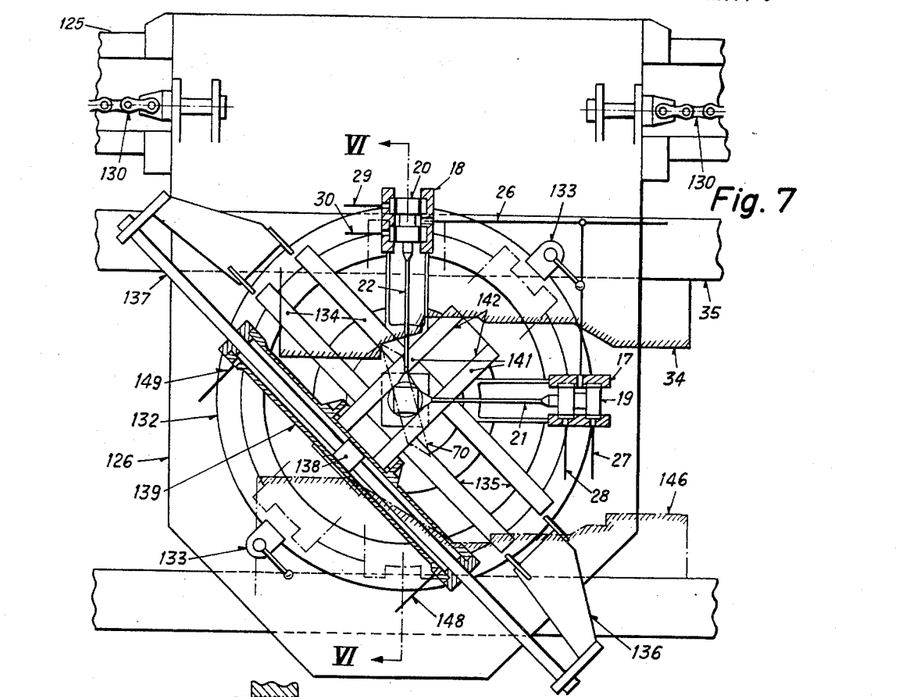
Fig. 7 is a partly sectional view of certain details of the control system employed with the lathe of Fig. 5.

Turning now to Figs. 5, 6 and 7, it will be seen how the basic principles of the present invention are applied in somewhat modified form to a shaft copying lathe. All parts identical to parts illustrated in Figs. 1 to 4 are, however, designated by the same reference numerals.

More specifically, a headstock 121 is arranged on the standard or bed 7 and is provided with a chuck 122 for gripping one end of the workpiece 1. A tailstock 124 for supporting the other end of the workpiece is slidably mounted on an upper crossarm 123, means (not shown) being provided for clamping the tailstock in position. The ultimate contours of the still to be machined workpiece are illustrated in broken lines in Fig. 5. As in the previously described embodiments of the invention, the saddle 3 is arranged for displacement along the slideway means 2 in a direction parallel to the axis of rotation 69 of the workpiece-supporting spindles in the head- and tailstocks.

The tool slide 9, which carries the cylinder 11, the tool 10 and the bearing housing 14, is arranged in guideways 8 on the saddle 3 for displacement at right angles to the axis of rotation of the workpiece. Disposed in the power cylinder 11, to the opposite ends of which the conduits 29 and 30 lead, is the piston 12, the piston rod 13 extending from the latter being fixed to the saddle 3.

The template holder 35 and the template 34 are mounted on the machine bed 7 by means of supports 33. A guide rail 125 is also mounted on the machine bed 7 by means of suitable supports, said rail extending parallel to the slideway means 2 and displaceably supporting a control slide 126.

The drive means for said control slide consist of a transmission 59 driven from the headstock 121 and provided with a worm 127 which meshes with and rotates a worm gear 128 connected to a sprocket wheel 129. A sprocket chain 130 extending over and meshing with the sprocket wheel 129 and an idler wheel 131 is connected at its two ends with the control slide 126. Upon actuation of the feed transmission or gearing 59, the slide 126 can thus be displaced in one direction or another at a controllable speed.

A turntable 132 is rotatably mounted on the slide 126 and may be clamped in position on the latter by means of clamping devices 133. A frame-like structure consisting of a pair of parallel bars 134 is arranged on the turntable 132 and provided with an intermediate recess 135 shaped in the manner of a universal joint socket, the feeler lever 15 extending through and being guided in said recess.

A piston rod 137 carrying a centrally arranged piston 138 extends parallel to the bars 134, the opposite ends of the piston rod 137 being fixed to supports 136 mounted on the turntable 132. A cylinder 139 longitudinally displaceable relative to the piston rod 137 surrounds the central portion of the latter and the piston 138 and carries on a bracket 140 a frame-like structure consisting of a second pair of parallel bars 141 disposed at right angles to the bars 134, the feeler lever 15 further extending through and being guided in an intermediate recess 142 of the parallel bar pair 141, the recess 142 being also shaped in a manner of a universal joint socket.

As has been noted hereinabove, in the embodiments of Figs. 1, 2 and 3 the displacements of the saddle 3 and tool slide 9 are effected by means of simple hydraulic piston and cylinder combinations 4, 5 and 11, 12.

In contradistinction to this, the means for displacing the saddle 3 on the slideway means 2 comprises a hydraulic drive or transmission 143 disposed on the saddle and controlled by the slide valve 19 of the control cylinder 17. The transmission 143 drives a pinion 144 which meshes with a rack 145 located on the machine bed 7.

The relationship between the control cylinders 17 and 18 is the same as in the embodiments of Figs. 1 and 2, i.e. the axes of these control cylinders are at right angles to one another and extend parallel to the displacement directions of the saddle 3 and the tool slide 9, respectively.

The operation of the copying lathe illustrated in Figs. 5, 6 and 7 is as follows:

The machining of the workpiece is to be such that a plurality of shoulders disposed perpendicularly to the axis of rotation 69 are formed. The turntable 132 is accordingly located on the slide 126 in the position shown in Figs. 5 and 7, whereby the two parallel bar frames 134 and 141 are arranged at respective angles of 45° to said axis of rotation.

To effect the feed movement or traverse of the saddle 3 along the slideway means 2, the feed transmission 59, which operates in dependence on the speed of rotation of the spindle in the headstock 121, is actuated. The slide 126 is thus drawn from right to left along the guide rail 125 at the desired feed velocity by the operation of the motion transmitting means 127 to 131.

By means of the bars 134 and 141, which engage the feeler lever 15, the latter is pivotally shifted or tilted to the left. This results in a displacement of the control slide valve 19 to the right, whereby pressure medium flows from the conduit 26 through the conduit 27 and into the hydraulic transmission 143. Pressure medium displaced from the latter returns via conduit 28 and the left-hand side of the control slide valve 19 via conduit 150 into the reservoir 24. The hydraulic transmission 143 is thus actuated and drives the pinion 144 meshing with the rack 145 through any suitable means (not shown) to effect displacement of the saddle along the slideway means 2.

During sensing of the template 34 by the feeler head 70, a small force must be exerted on the latter to press it in the direction of and against the template. This is effected by means of the flow of fluid pressure medium through the conduit 149 into the cylinder 139 which, together with the parallel bars 141 fixed thereto, is displaced relative to the fixed piston 138 upwardly and to the left as seen in Fig. 7.

Due to the upward movement of the feeler lever 15 the control slide valve 20 is moved downwardly (see Fig. 6) to enable the pressure medium to flow from the conduit 26 through the conduit 30 and to the upper side or face of the piston 12. Pressure medium displaced from the lower side of piston 12 escapes via conduit 29 and the upper side of control slide valve 20 into conduit 150 and back into the reservoir 24. In this manner the tool slide 9 with the tool 10 and the bearing housing 14 are moved upwardly. This movement lasts until the feeler head 70 contacts the template 34 to reestablish the state of hydraulic equilibrium in the control system.

Due to the constant feed movement of the slide 126 and due to the small pressure acting to force the feeler head 70 against the template 34, the saddle 3 and the tool slide 9 are either alternately or simultaneously displaced in accordance with the movements of the feeler lever 15, which movements are determined in accordance with the profie of the template and control the displacements of the slide valves 19 and 20. In this manner, there is imparted to the workpiece 1 by means of the tool 10 a profile or contours corresponding to the profile or contours of the template 34.

As in the preceding embodiments of the invention, it is also possible in this case to interrupt the feed movement of the saddle or carriage 3 and to effect the retraction of the tool 10 from the workpiece 1, as well as the return of the carriage 3 to its starting position by suitable means such as limit switches or like devices (not shown).

Figure 7A:
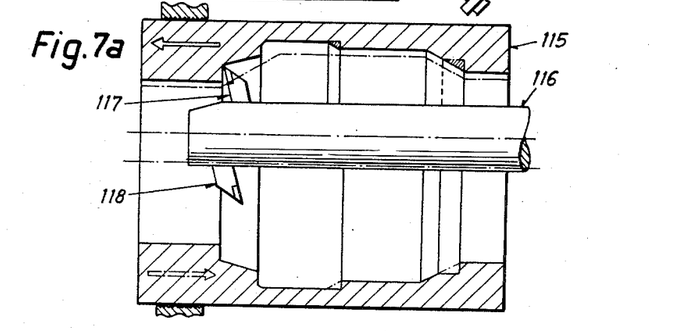
Fig. 7a is a sectional view of an internally machined workpiece.

Reference to Figs. 6, 7 and 7a, furthermore, will show that the lathe may be employed together with two oppositely arranged templates 34 and 146. As may be seen from the schematic or diagrammatic illustration of Fig. 7a, a workpiece 115 having an initial and rough internal profile indicated by the broken lines may be machined into final condition by means of two tools 117 and 118 controlled by the double template system.

This machining operation proceeds as follows:

Referring first to Fig. 7, the upper template 34 in solid lines indicates the profile which can be formed by the tool 117 during constant feed movement or traverse of the slide 126 from the right to the left. As described hereinabove, pressure medium is fed through the conduit 149 into one end of the cylinder 139 to ensure sensing of the template 34.

At the left-hand end of the feed path, the feed movement is interrupted, pressure removed from the conduit 149 and applied to the other end of the cylinder 139 through the conduit 148, and the direction of rotation of the feed transmission or gearing 59 reversed. Through this reversed movement the feeler head 70 engages the template 146 and the saddle 3 moves at its predetermined traverse velocity from left to right.

As a result, the workpiece 115 has machined from its lower half, in accordance with the contours of the template 146, the small regions defined by broken lines in Fig. 7.

In a similar manner both inner and outer contours may be machined by means of the embodiments of Figs. 1, 2 and 3 through the use of suitably designed tool holders.

Since the angular relationship between the two slides of carriages 3 and 9 is fixed, it is possible to provide a more stable work-tool support than has heretofore been possible with pivotally arranged upper tool slides.

Figure 8A:
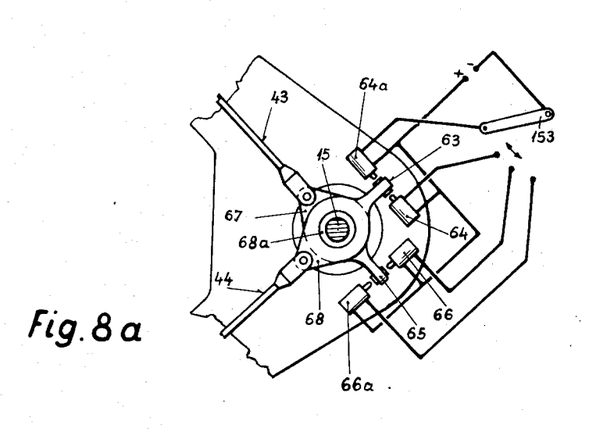
Fig. 8a is a view showing details of the feeler head.

Referring now to Fig. 8a, such shows the details of the feeler head and its control. By means of a schematically shown selector switch 153 any one of them may be energized. The selector switch 153, however, could be replaced by automatically acting switches arranged in the machine to control a desired operating cycle.

Figure 8B:
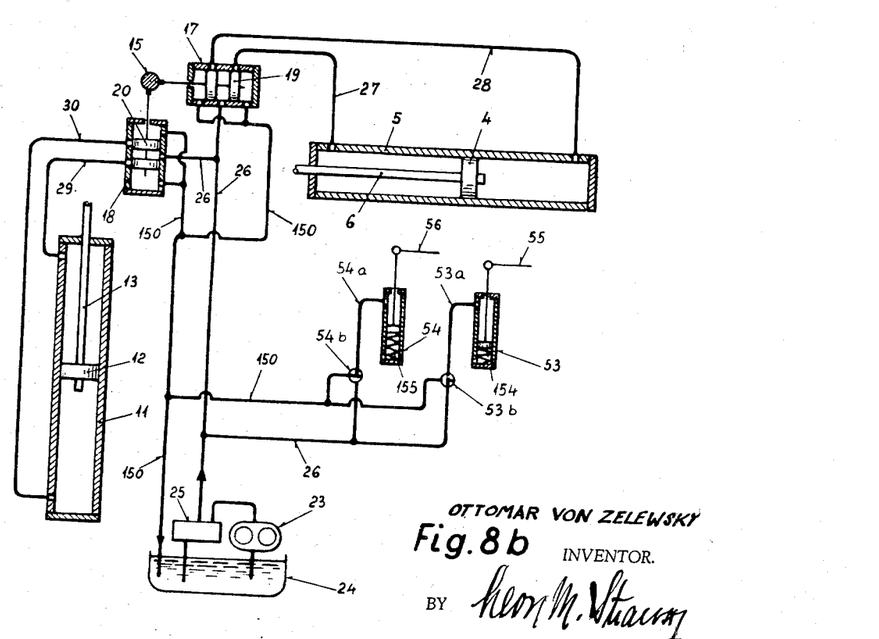
Fig. 8b is a schematic view of the valve system.

Fig. 8b shows a schematic sketch of the valve system. For machining the workpiece 1, a suitable constant feed movement is to be imparted to the saddle 3. This is done through the intermediary of the flexible shaft 61. By applying pressure medium from conduit 26 (see Fig. 8b) via valve 53b and conduit 53a into operating cylinder 53, the compression spring 154 is compressed and the linkage 55 lowered, whereby clutch 51 is engaged. Rotational motion from the flexible shaft 61 is transmitted to the pinion 49 which displaces the rack 41 in the rack support 39. Connected with the rack 41 is the connecting rod 43 carrying the guide piece 67 sliding on the ball-like part 67a of the feeler lever 15. Upon energization of the magnet 66a, the feeler head 70 is drawn downwardly and to the left (as seen in Fig. 1) against the template 34, i.e., perpendicularly to the direction of feed movement of the feeler means 15 and 70.

The present invention further renders it possible, where machining of relatively wide surface depressions is concerned, to machine simultaneously those surfaces defining the opposite ends or borders of said depressions and extending perpendicularly to the axis of rotation of the workpiece.

By way of résumé, therefore, it is contemplated in accordance with the present invention to apply two differently directed forces to a universally mounted feeler member, one of these forces ensuring contact between the feeler member and a template employed to control the machining operation while the other force effects movement of the feeler member along the template.

These forces, by way of example, are exerted, respectively, by the means 65—66 and 59—41 in Fig. 1, by the means 76—63 and 59—42 in Fig. 2, by the means 111—109—95 and 59—99—105 in Fig. 3 and by the means 139—141 and 59—130—126 in Figs. 5 to 7.

According to the invention, furthermore, the machine tool, the operation of which is controlled by the aforesaid template, includes a tool slide which is constrained to move along two coplanar coordinates oriented at right angles to one another. This is effected by the slideway means 2 which guide the saddle 3 in one path or coordinate and by the slideways 8 on the saddle which not only guide the tool slide 9 in another path or coordinate at right angles to the first-named path but which ensure that the tool slide moves together with the saddle. Moreover, both sets of slideways (2 and 8) prevent all pivotal movement of the tool slide relative to the workpiece.

The movements of the tool slide linearly along these two coordinates are controlled and determined through the intermediary of the control means 17—19 and 18—20 by the movements of the feeler member 70 along the template induced by the above-mentioned two forces, the directions of application of which define or lie in a plane substantially parallel to the plane of movement of the tool slide.

Having thus described the invention, what is claimed as new and desired to be secured by Letters Patent is:

1. An arrangement for imparting to a rotating workpiece a profile in accordance with predetermined surface contours of template means; saddle means arranged for reciprocal traverse parallel to the axis of rotation of said workpiece, first power means operatively connected to said saddle means for effecting said reciprocal traverse of the latter, tool slide means mounted on said saddle means for movement therewith parallel to said axis and for reciprocal displacement relative to said saddle means in a direction perpendicular to said axis, second power means operatively connected to said tool slide means for effecting said reciprocal displacement thereof on said saddle means toward and away from said workpiece, respectively, feeler means located adjacent and engageable with said template means and arranged for shifting movements relative to said template means, means operatively connected to said feeler means for exerting a force on the latter so as to bring the same into engagement with and exerting a constant pressure against the contoured surface of said template means, feed means operatively connected to said feeler means for effecting displacement of the latter along said template means, and control means operatively connected to said first and second power means and operated in response to said shifting movements imparted to said feeler means in accordance with said surface contours of said template means during displacement of said feeler means along said template means by said feed means so that said saddle means and said tool slide means are traversed along said workpiece and said tool slide means is simultaneously reciprocally displaced relative to said workpiece in direct dependence on said shifting movements of said feeler means induced by said surface contours of said template means to enable a tool, when held by said tool slide means and when in engagement with said workpiece, to form said profile on said workpiece.

2. A control system for imparting to a workpiece a profile corresponding to the profile of at least one template, whereby the latter is engageable with profile-sensing feeler means, said control system including first means operatively connected with said feeler means to apply to the latter forces directed along two coordinates defining a first place for bringing said feeler means into engagement with and for moving the same along said template so that there is exerted a continuous pressure between the template and said feeler means and so that there is imparted to the latter shifting movements corresponding to said profile of said template, holder means for a tool, operatively connected to said feeler means and to said holder means for movements of the latter along two coordinates in relation to the shifting movements of said feeler means so that said tool in engagement with said workpiece imparts said profile to said workpiece during a working operation, said last mentioned coordinates being preferably parallel and perpendicular to the axis of said workpiece and defining a second plane substantially parallel to said first plane.

3. A control system for imparting to a workpiece a profile corresponding to the profile of at least one template, whereby the latter is engageable with profile-sensing feeler means, said control system including first means operatively connected with said feeler means to apply to the latter forces directed along two coordinates defining a first place for bringing said feeler means into engagement with and for moving the same along said template so that there is exerted a continuous pressure between the template and said feeler means and so that there is imparted to the latter shifting movements corresponding to said profile of said template, holder means for a tool, and second means operatively connected to said feeler means and to said holder means for movements of the latter along two coordinates in relation to the shifting movements of said feeler means so that said tool in engagement with said workpiece imparts said profile to said workpiece during a working operation, said last mentioned coordinates being preferably parallel and perpendicular to the axis of said workpiece and defining a second plane substantially parallel to said first plane, said first means being designed to reverse the movement of said holder means relative to said workpiece on completion of said working operation.

4. A machine tool for imparting to a rotating workpiece contours coresponding to the profile of at least one template, duplicated then successively, with a duplicating device, operating in two dimensions in a plane through the axis of said workpiece, said duplicating device consisting of a saddle slide for reciprocal movement in a certain direction along slide ways, a tool slide moving along slide ways on said saddle slide in a direction making an angle with the moving direction of said saddle slide, a first power mechanism for moving said saddle slide in both directions, a second power mechanism for moving said tool-holding slide in both directions relative to said saddle slide and a sensing mechanism being connected with said tool-holding slide, said sensing mechanism being operatively connected to said toolholding slide and said first and second power mechanism so that said sensing mechanism imparts to said toolholding slide and thereby to the tool the same movement as being given the feeler of said sensing mechanism, by means of said saddle slide and said both power mechanisms, said feeler being operatively connected with a third and fourth mechanism and being independent from said saddle slide and said toolholding slide, dragging said feeler with their combined action along said template, said third mechanism imparting with a prescribed speed to said feeler a movement in a certain direction, said third mechanism acting independently of said template, the fourth mechanism for imparting to said feeler in another direction the complementary movement necessary for following said template, said fourth mechanism being regulated in a direct manner by said template, said directions being perpendicular to each other and being parallel to the moving directions of respectively said saddle slide and said toolholding slide or in the reverse order.

5. A machine tool according to claim 4, said third mechanism including means for imparting to said feeler prescribed speeds in different directions, said means acting on said feeler successively.

6. A machine tool according to claim 4, said fourth mechanism including means for imparting to said feeler the complementary movement necessary for following said template in different directions, said means acting on said feeler successively.

7. A machine tool according to claim 4, said third mechanism for imparting to said feeler movement with a prescribed speed in a certain direction including a first housing rigidly fastened on the toolslide, said housing having a rack movable therein in a sliding manner, said rack being fastened with a rod on said feeler, said rod allowing small lateral movements between said rack and said feeler, a second housing slidably movably disposed in said first housing along slide ways on said bed of said machine tool perpendicular in the direction of said rack, a pinion fixed on said second housing and meshing with said rack, a driving mechanism driving said pinion, the speed of said feeler in the direction of said rack being determined by said pinion.

8. A machine tool according to claim 4, said fourth mechanism including a magnet for moving said feeler in a certain direction as far as the template is allowing said magnet being fastened rigidly on said toolslide.

9. A machine tool according to claim 4, said fourth mechanism including a hydraulic piston for moving said feeler in a certain direction as far as the template is allowing.

10. In a machine tool for imparting to a rotating workpiece contours corresponding to the profile of a template, the combination of toolholding slide means slidably movable along two first coordinates defining together a first plane through the axis of said workpiece, respective drive means for sliding movement of said slide means along said coordinates, and feeler means supported on said slide means for movement therewith and for relative universal pivoting displacement thereon; with respective displacing means connected with said feeler means and acting thereupon in two directions, said directions including an angle with respect to each other to impart to said feeler means a composite leading displacement along and into contact with said template, respectively, and respective sensing means connected to said feeler means for sensing displacements of the latter in directions parallel to said saddle slide and parallel to said tool slide, respectively, each of said sensing means being operatively connected with the respective one of said drive means, whereby said saddle slide and said tool slide will be imparted a follow-up movement along said rotating workpiece by said respective drive means in dependency of said leading displacement imparted to said feeler means by said displacing means and sensed by said sensing means.

References Cited in the file of this patent
UNITED STATES PATENTS

| | | |
|---|---|---|
| 1,668,518 | Shaw | May 1, 1928 |
| 2,332,533 | Roehm | Oct. 26, 1943 |
| 2,475,326 | Johnson | July 5, 1949 |
| 2,580,686 | May | Jan. 1, 1952 |
| 2,594,694 | Smith | Apr. 29, 1952 |
| 2,601,345 | Turchan | June 24, 1952 |
| 2,634,644 | Johnson | Apr. 14, 1953 |
| 2,691,913 | Waterson | Oct. 19, 1954 |
| 2,773,432 | De Vlieg | Dec. 11, 1956 |
| 2,796,793 | Addison | June 25, 1957 |